United States Patent [19]
Jannot et al.

[11] Patent Number: 6,024,236
[45] Date of Patent: Feb. 15, 2000

[54] HOUSING ASSEMBLY FOR ELECTRICAL OR ELECTRONIC BUILT-IN COMPONENTS

[75] Inventors: Joachim Jannot, Aalen; Michael Bach, Oberndorf, both of Germany

[73] Assignee: Rittal-Werk Rudolf Loh GmbH, Herborn, Germany

[21] Appl. No.: 09/152,948

[22] Filed: Sep. 14, 1998

[51] Int. Cl.$^7$ .................................................. B65D 43/14
[52] U.S. Cl. ........................ 220/4.02; 220/3.5; 220/3.8; 220/3.94; 174/66
[58] Field of Search ............................... 220/3.2, 3.3, 3.5, 220/3.8, 3.9, 3.92, 3.94, 242, 4.02, 661, 740, 23.83, 23.86, 913; 206/514; 174/66, 67

[56] References Cited

U.S. PATENT DOCUMENTS

| | | | |
|---|---|---|---|
| 1,815,855 | 7/1931 | Lauritano | 220/3.3 |
| 3,151,759 | 10/1964 | Dykzeul | 220/3.94 |
| 3,648,878 | 3/1972 | Mackay et al. | 220/4.01 |
| 4,365,723 | 12/1982 | Palermo et al. | 220/3.8 |
| 4,505,403 | 3/1985 | Bowden, Jr. et al. | 220/242 |
| 4,712,157 | 12/1987 | Simonson et al. | 361/643 |
| 5,228,584 | 7/1993 | Williams, Jr. | 220/3.8 |
| 5,238,133 | 8/1993 | Cox | 220/3.8 |
| 5,317,108 | 5/1994 | Prairie, Jr. | 174/67 |
| 5,499,734 | 3/1996 | Tessmer | 220/4.21 |
| 5,929,379 | 7/1999 | Reiner et al. | 174/66 |

*Primary Examiner*—Stephen Castellano
*Attorney, Agent, or Firm*—Jansson, Shupe, Bridge & Munger, Ltd.

[57] ABSTRACT

The invention pertains to a housing assembly for electrical or electronic built-in components, with an outer housing feature two lateral walls, a rear wall, a front cover, a roof and a floor, and an inner housing that is lodged with spacing from the wall parts of the outer housing. In a visually appropriate design favorable conditions for ambient weather influences can be provided simultaneously, in that the roof of the outer housing is constructed such that it is curved convexly upward and drops off toward the lateral walls, such that the front cover is curved convexly toward the front, and that the transition between the roof and the front cover is formed of an obliquity that drops off toward the front.

20 Claims, 1 Drawing Sheet

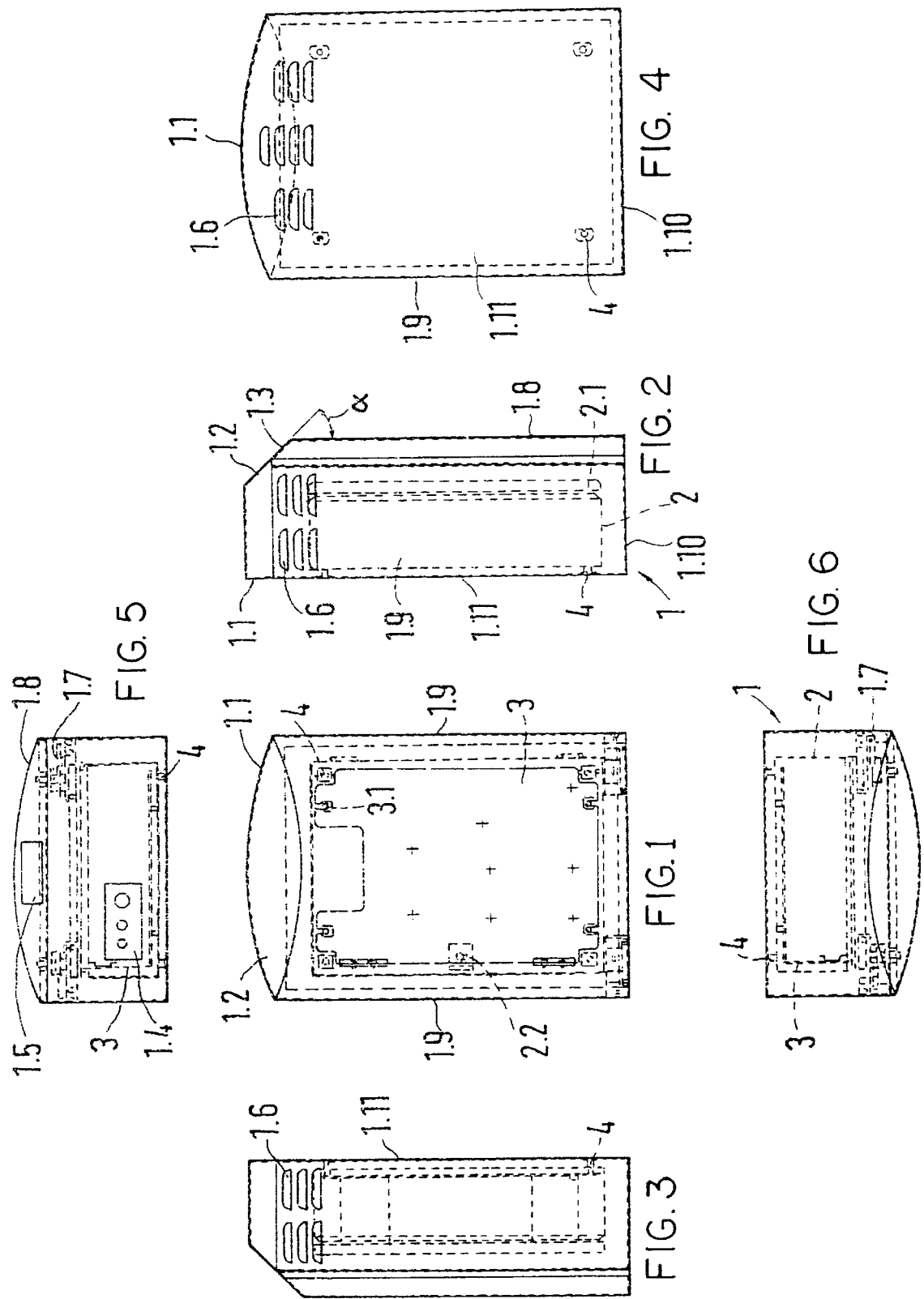

HOUSING ASSEMBLY FOR ELECTRICAL OR ELECTRONIC BUILT-IN COMPONENTS

RELATED APPLICATION AND CLAIM OF PRIORITY

This application claims priority from German Application No. DE 297 16 467.8, filed Sep. 15, 1997.

BACKGROUND AND SUMMARY OF THE INVENTION

The invention relates to a housing assembly for electrical or electronic built-in components, and in particular, to a housing assembly with an outer housing featuring two side walls, a rear wall, a front cover, a roof and a floor; and including an inner housing that is lodged inside the outer housing at a distance from these wall parts.

A housing assembly of this type is indicated as known in WO 96/34519, wherein a cuboid inner cabinet is built inside a water splash-proof outer cabinet with spacing on all sides. The inner cabinet is provided with a cooling device. However, it has been determined that such prior housing assemblies have various aesthetic and functional shortcomings associated therewith.

Therefore, it is a primary object and feature of the present invention to provide a housing assembly for electrical or electrical built-in components which is aesthetically pleasing.

It is a further object and feature of the present invention to provide a housing assembly for electrical or electrical built-in components which incorporates advantages with regard to the impact of the weather thereon.

It is a still further object and feature of the present invention to provide a housing assembly for electrical or electrical built-in components overcoming some of the problems and shortcomings of the prior art.

In accordance with the present invention, a housing assembly is provided having an outer housing with a generally convex roof which curves downwardly in the direction of first and second lateral walls. The outer housing further includes a generally convex front cover which curves toward the front thereof. The transition between the roof and the front cover is formed by an obliquity that drops off from the roof toward the front of the outer housing.

The convex-shaped roof and the forwardly directed obliquity provide not only a visually appropriate appearance, but also provide for moisture to be conducted away as rapidly as possible from the roof area, so that negative influences caused thereby are diminished.

To lead moisture away from the roof, there are further favorable features including a removable front cover having an upper edge area receivable under the obliquity and being held in place by a catch; and a front edge of the obliquity being provided with a curved outer contour which closes off the front cover or projects over it with a small, constant spacing, such that the upper edge of the front cover is covered and a drip edge is formed by means of the front edge of the obliquity, with water collecting in the most forward area of the drip edge and being conducted away by means of same. The catch holds the front cover secure.

The catch is protected within and also prevents unauthorized access to the interior of the outer housing. It is provided that the catch is accessible for unlocking by means of at least one lateral bore hole in the outer housing.

Alternatively, it can be provided that the front cover is built as an outer door and that the front section of the obliquity from the front edge of the roof onward is constructed over the upper side of the outer door.

In order to implement air conditioning by using natural convection, favorable measures include providing horizontal ventilation slots in the upper end area of the lateral walls and/or the rear wall. These slots are covered by lamellae that are directed obliquely downward and extend outwardly from the laterals and/or rear wall. Cut out sections are provided in the floor and/or the underside of the front cover.

A favorable situation for fastening the inner housing to the outer housing results if the inner housing is fastened in the outer housing by connecting means on its rear side and on the inside of the rear wall of the outer housing. The connecting means advantageously features spacer sleeves or rubber buffers. Rubber buffers can simultaneously dampen any oscillations.

In order to access the inside of the inner housing, a particularly advantageous measure in connection with the removable front cover is that the inner housing features a door with a lock on its front side, and that a mounting plate is arranged in the inner housing. Built-in components in the inner housing can be attached in a simple manner to the mounting plate.

The mounting plate may be angled at least on one side, extending along the rear wall of the inner housing and along at least one side wall of the inner housing, in order to provide sufficient area to mount electrical components thereon.

To implement air conditioning, while minimizing space, a heat exchanger is arranged on the upper side of the inner housing in an opening.

In order to also assure the greatest possible constancy of internal temperature, even when intense variations in outside temperatures arise, a thermostat may be provided in the inner housing and/or a control for the air conditioning and a heating unit may be provided.

A stable, and in particular, a vandal-proof attachment of the housing assembly is achieved by means of the fact that on the rear wall of the outer housing a device is provided for mounting the housing assembly on a pole or a wall fixture.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 1 is a front elevational view of the housing assembly of the present invention;

FIG. 2 is a side elevational view of a first side of the housing assembly of the present invention;

FIG. 3 is a side elevational view of a second side of the housing assembly of the present invention;

FIG. 4 is a rear elevational view of the housing assembly of the present invention;

FIG. 5 is a bottom plan view of the housing assembly of the present invention; and FIG. 6 is a top plan view of the housing assembly of the present invention.

DETAILED DESCRIPTION OF THE PREFERRED EMBODIMENT

The outer housing 1 features two lateral walls 1.9, a rear wall 1.11, a roof 1.1, a floor 1.10 as well as a front cover 1.8, whereby the roof 1.1 is designed convexly curved upward and dropping off at both sides, and the front cover 1.8 is curved toward the front. The transition between the roof 1.1 and the front cover 1.8 is formed by an obliquity 1.2 that is welded on and which, for example, drops off at an angle of approximately 45 degrees toward the front, so that the obliquity 1.2 features a lens-shaped contour, as can be seen in FIG. 1. The front section 1.3 of the obliquity 1.2 projects over the upper side of the front cover 1.8 and locks, at its front edge, together with the contour of the front cover that is curved outward. The front edge of the obliquity 1.2 thus forms a drip edge, in the central area of which moisture that flows off can collect and can be led away, so that this can not penetrate at the transitions of individual wall parts.

As can be seen in FIG. 1, in the floor 1.10 there is a section 1.4 which can simultaneously serve as the entry of cables. Another cut out section 1.5 is provided on the underside of the front cover 1.8. In the lateral walls 1.9 and the rear wall 1.11, as shown in FIGS. 2–4, ventilation slots 1.6 are constructed which are protected from rainfall penetration by lamellae that drop off obliquely toward the outside. A natural convection and thus the removal of heat resulting from stray power is thereby achieved by having outside air enter into the cut out sections 1.4, 1.5 and out of the ventilation slots 1.6.

The removable front cover 1.8 is pushed at its upper side under the front section 1.3 of the obliquity 1.2 and is fixed with a catch 1.7, whereby means for locking can be provided in the upper area of the front plate and hook like or engaging attachment means can be provided in the lower area of the frame-like opening of the outer housing 1 that is covered by it. The catch can be unlocked by means of actuation of two locking means that are positioned inside, said locking means being accessible through a lateral bore hole in the lower area of the outer housing 1. The catch is thereby not only lodged in a protected manner, but is also secured from unauthorized access.

The inner housing 2 is designed as a cuboid and also features lateral walls, an upper side, a lower side, a rear wall 2.3 as well as a front cover which is constructed as a door 2.1. When the front cover 1.8 is removed, the door 2.1 of the inner housing 2 is secured by a lock 2.2 which is easily accessible and serviceable. A casement fastener 2.2, for example, can serve well as a lock.

On the inside of the inner housing 2, a beveled mounting plate 3 is attached by means of fastening means 3.1 and extends along the rear wall 2.3 and one side, so that a large mounting surface is provided.

A flat heat exchanger, e.g. in the form of an air—air Peltier heat exchanger is mounted in the upper side of the inner housing. The mounting plate 3 bears a heater and two thermostats laterally, which serve to is control the air conditioning device. Furthermore, a power supply for the air conditioning device can also be provided.

The housing assembly is built for pole or wall fastening. The connecting means 4 can simultaneously be used for pole or wall fastening, and can be used to produce the connection between the outer housing 1 and the inner housing 2 and are also accessible from the outside. At least one profile rail is provided for reinforcement.

The housing assembly can be fabricated of aluminum-zinc sheet metal, stainless steel or aluminum. Among others, components which were not specifically manufactured for outside application can also be used in outdoor applications, since the housing assembly with a tightly sealing inner housing 2 can feature a high degree of protection and an air conditioning device.

Various modes of carrying out the invention are contemplated as being within the scope of the following claims particularity pointing out and distinctly claiming the subject matter regarded as the invention.

What is claimed:

1. A housing assembly for electrical components, comprising:
    an outer housing having a front and a rear wall, and being defined by first and second side walls and a generally convex roof extending upwardly from the side walls;
    an inner housing lodged within the outer housing at a location spaced from the side walls of the outer housing;
    a generally convex front cover removably mounted to the front of the outer housing; and
    a transition wall extending between the roof and the front cover at an oblique angle to the roof and to the front cover.

2. The housing assembly of claim 1 wherein the transition wall includes a front edge, and further comprising a catch mounted to the front edge of the transition wall for interconnecting the front cover to the transition wall.

3. The housing assembly of claim 2 wherein the outer housing includes a lateral bore extending therethrough for providing access to the catch.

4. The housing assembly of claim 2 wherein the front cover includes a generally arcuate upper edge, the front edge of the transition wall overlapping the upper edge of the front cover.

5. The housing assembly of claim 1 wherein the first side wall includes a ventilation slot therein.

6. The housing assembly of claim 1 further comprising a fastening structure for interconnecting the inner housing to the rear wall of the outer housing.

7. The housing assembly of claim 1 wherein the fastening structure includes a spacer for spacing the inner housing from the rear wall of the outer housing.

8. The housing assembly of claim 1 wherein the inner housing includes a door movable between a first open position and a second closed position, and further including a locking structure for maintaining the door in the closed position.

9. The housing assembly of claim 1 further comprising a mounting element positioned within the inner housing for mounting the electrical components thereto.

10. The housing assembly of claim 1 further comprising a heat exchanger mounted within an opening in the inner housing.

11. The housing assembly of claim 1 further comprising a temperature control structure for varying the temperature within the inner housing.

12. A housing assembly for electrical components, comprising:
    an outer housing having first and second side walls and a generally convex roof extending therefrom;
    a cover removably mounted to the outer housing and including an upper edge, the cover movable between a first open position and a second closed position;
    a transition wall extending from the roof at an oblique angle thereto and overlapping the upper edge of the cover when the cover is in the closed position.

13. The housing assembly of claim 12 further comprising an inner housing supported within the outer housing at a location spaced form side walls of the outer housing.

14. The housing assembly of claim 13 wherein the inner housing defines a chamber therein for receiving the electrical components therein and includes a door movable between a first open position and a second closed position.

15. The housing assembly for claim 14 further comprising a mounting element position within the chamber of the inner housing for mounting the electrical components thereto.

16. The housing assembly of claim 14 further comprising a temperature control structure for controlling the temperature within the chamber in the inner housing.

17. The housing assembly of claim 12 wherein the transition wall extends at an oblique angle to the cover.

18. The housing assembly of claim 12 wherein cover is generally convex.

19. The housing assembly of claim 12 further comprising a catch mounted to the outer housing for maintaining the cover in the closed position.

20. The housing structure of claim 19 wherein the outer housing includes a bore extending therethrough for proving access to the catch.

* * * * *